(12) United States Patent
Robertsson et al.

(10) Patent No.: US 7,466,625 B2
(45) Date of Patent: Dec. 16, 2008

(54) NOISE ESTIMATION IN A VECTOR SENSING STREAMER

(75) Inventors: Johan Olof Anders Robertsson, Oslo (NO); Oeyvind Teigen, Notodden (NO)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 11/426,058

(22) Filed: Jun. 23, 2006

(65) Prior Publication Data

US 2007/0297287 A1    Dec. 27, 2007

(51) Int. Cl.
*G01V 1/38* (2006.01)
(52) U.S. Cl. .................. 367/24; 367/15; 367/20
(58) Field of Classification Search .................. 367/24, 367/58, 153, 15, 20; 181/104; 702/18
See application file for complete search history.

(56) References Cited

U.S. PATENT DOCUMENTS

| | | | |
|---|---|---|---|
| 3,283,293 A | 11/1966 | Pavey et al. | 340/7 |
| 4,437,175 A | 3/1984 | Berni | 367/24 |
| 4,477,887 A | 10/1984 | Berni | 367/20 |
| 4,486,865 A | 12/1984 | Ruehle | 367/24 |
| 4,520,467 A | 5/1985 | Berni | 367/24 |
| 4,618,949 A | 10/1986 | Lister | 367/171 |
| 4,827,459 A | 5/1989 | Franklin | 367/158 |
| 4,935,903 A | 6/1990 | Sanders et al. | 367/24 |
| 4,979,150 A | 12/1990 | Barr | 367/24 |
| 5,235,554 A | 8/1993 | Barr et al. | 367/13 |
| 5,365,492 A * | 11/1994 | Dragoset, Jr. | 367/21 |
| 5,384,753 A | 1/1995 | Sanders | 367/163 |
| 5,392,258 A | 2/1995 | Gabrielson et al. | 367/149 |
| 5,621,699 A * | 4/1997 | Rigsby et al. | 367/22 |
| 5,723,790 A | 3/1998 | Andersson | 73/514.36 |
| 5,774,416 A * | 6/1998 | Sadek et al. | 367/24 |

(Continued)

FOREIGN PATENT DOCUMENTS

EP    0089700    9/1988

(Continued)

OTHER PUBLICATIONS

U.S. Appl. No. 10/792,511, filed Mar. 3, 2004, Tenghamn, et al.

(Continued)

*Primary Examiner*—Jack W Keith
*Assistant Examiner*—Scott A Hughes
(74) *Attorney, Agent, or Firm*—Ari Pramudji; Liangand (Mark) Ye; Jeffrey E Griffin (57) ABSTRACT

A method includes recording a first set of data using a first type of sensor; recording a second set of data using a second type of sensor, the first and second sets of data being contemporaneously acquired by co-located sensors; and removing noise from the first data set using the second data set. An apparatus includes a survey vessel towing an array of towed streamers including a plurality of paired, co-located sensors densely distributed along the streamers. A first one of each sensor pair is of a first type and a second one of each sensor pair is of a second type. A computing apparatus records a first set of data acquire by the first type of sensor and a second data set acquire by the second type of sensor. The computing apparatus then removes noise from the first data set using the second data set.

23 Claims, 5 Drawing Sheets

U.S. PATENT DOCUMENTS

| | | | | |
|---|---|---|---|---|
| 5,825,716 | A | * | 10/1998 | Starr ............................ 367/24 |
| 5,971,095 | A | | 10/1999 | Ozbek |
| 5,991,238 | A | * | 11/1999 | Barr ............................. 367/62 |
| 6,021,090 | A | * | 2/2000 | Gaiser et al. .................. 367/15 |
| 6,021,091 | A | * | 2/2000 | Gaiser .......................... 367/20 |
| 6,021,092 | A | * | 2/2000 | Paffenholz et al. ............ 367/24 |
| 6,172,940 | B1 | | 1/2001 | Mcconnell et al. .......... 367/178 |
| 6,370,084 | B1 | | 4/2002 | Cray ........................... 367/141 |
| 6,446,008 | B1 | | 9/2002 | Ozbek |
| 6,453,745 | B1 | | 9/2002 | Jalkanen .................. 73/514.09 |
| 6,512,980 | B1 | | 1/2003 | Barr ............................... 702/1 |
| 6,651,007 | B2 | | 11/2003 | Ozbek |
| 6,684,160 | B1 | | 1/2004 | Ozbek et al. |
| 6,894,948 | B2 | * | 5/2005 | Brittan et al. ................. 367/24 |
| 2004/0042341 | A1 | | 3/2004 | Tenghamn et al. ............ 367/15 |
| 2004/0141355 | A1 | * | 7/2004 | Robertsson et al. ......... 365/145 |
| 2005/0013194 | A1 | | 1/2005 | Vaage et al. .................. 367/24 |
| 2005/0090987 | A1 | * | 4/2005 | Amundsen et al. ............ 702/14 |
| 2005/0160814 | A1 | | 7/2005 | Vaganov et al. .......... 73/514.01 |
| 2005/0194201 | A1 | | 9/2005 | Tenghamn et al. .......... 181/112 |
| 2005/0195686 | A1 | | 9/2005 | Vaage et al. .................. 367/21 |
| 2005/0202585 | A1 | | 9/2005 | Eskridge ....................... 438/50 |
| 2006/0050611 | A1 | * | 3/2006 | Borresen ...................... 367/24 |
| 2006/0203611 | A1 | * | 9/2006 | Robertsson et al. ........... 367/13 |
| 2006/0253256 | A1 | * | 11/2006 | Robertsson et al. ........... 702/14 |
| 2006/0285435 | A1 | * | 12/2006 | Robertsson ................... 367/24 |
| 2007/0189117 | A1 | * | 8/2007 | Robertsson et al. ........... 367/24 |
| 2007/0195648 | A1 | * | 8/2007 | Borgen et al. ................ 367/178 |

FOREIGN PATENT DOCUMENTS

| | | | |
|---|---|---|---|
| EP | 0460789 | | 5/1995 |
| GB | 2381314 A | * | 4/2003 |
| GB | 2392495 | | 3/2004 |
| GB | 2412732 A | * | 10/2005 |
| GB | 2435513 A | * | 8/2007 |
| WO | WO2004/081583 | | 9/2004 |

OTHER PUBLICATIONS

Amundsen, "Wavenumber-based filtering of marine point-source data," *Geophysics,* 58(9):1335-1348, 1993.

Ozbek, "Multichannel adaptive interference canceling," *SEG Technical Program Expanded Abstracts,* 19:2088-2091, 2000.

* cited by examiner

NOISE ESTIMATION IN A VECTOR SENSING STREAMER

BACKGROUND OF THE INVENTION

1. Field of the Invention

The present invention pertains to marine seismic surveying and, more particularly, to marine seismic surveying employing vector sensing streamers.

2. Description of the Related Art

In one kind of marine seismic survey, a survey vessel tows an array of seismic cables, frequently referred to as "streamers," along a predetermined course. As the vessel tows the array, a seismic source, such as an airgun or a vibroseis source, imparts an acoustic wave into the water. The acoustic wave travels through the water and is eventually reflected by various geological features. The reflections travel back up through the water to the streamers. The streamers include acoustic sensors, or "hydrophones," distribute along its length. As the reflections pass over the acoustic receivers, the receivers sense the magnitude of the passing wavefront. The acoustic receivers then transmit data representing the detected magnitude of the passing wavefront back up the seismic cables to the survey vessel for collection.

The reflections continue propagating through the water past the acoustic receivers until they reach the water's surface. At the surface, the reflections are reflected once again. This reflection of the reflections are sometimes called "ghost reflections." The ghost reflections travel back down through the water and will also pass over the acoustic receivers. The acoustic receivers once again sense the magnitude of the passing wavefront. The acoustic receivers also once again transmit data representing the detected magnitude over the seismic cables for collection aboard the survey vessel.

Thus, the survey data contains not only data obtained from the initial reflections, but also data collected from the multiples. The data from the multiples is undesirable because it is not representative of the geological formations being surveyed. Instead, data from the multiples is representative of the surface. More technically, the multiples "destructively interfere" with the reflections. In short, the seismic sensors sense the magnitude of any passing wavefront without regard to the direction of its travel.

Conventional approaches address this problem in two ways. One way is to try and mitigate the influence of multiples during the survey. A second way is to try to back out the multiples data during processing. Both approaches have their drawbacks.

Mitigating multiples during the survey frequently involves positioning the components of the survey in a particular fashion. For example, ghost reflections can often be largely canceled out if the seismic cables are towed at a depth of approximately 4-5 meters. However, positioning streamers can be very difficult. Streamers may be several kilometers long. This typically results in a rather large inertia that can make the streamer difficult to control. The streamer may also be subjected to very different environmental conditions—such as wind and current—along its length. This means that the streamer may frequently be inaccurately positioned so that the adverse effect of the multiples is not fully mitigated.

Backing out the multiples during processing typically involves predicting the actual multiples from a number of factors. A variety of multiples prediction techniques are known to the art. However, as with all prediction techniques, assumptions and generalizations are made. While these generalizations and assumptions may be statistically viable, they may apply to any given survey—or any given portion of a survey—with more or less accuracy. In some surveys, they consequently may have a harmful effect or otherwise create inaccuracies. Furthermore, this approach lengthens complicated processing, thereby driving up costs. It would therefore be desirable to mitigate the effect of multiple without having to expend the time, effort and resources to continuously monitor and position the seismic cables. It would also be desirable to be able to mitigate the efforts of multiples through actual measurements rather than predictions. Consequently, it would also be desirable to not measure the magnitude of any given wavefront passing the acoustic sensors, but also its vector, or polarization.

Thus, one possibility for the future is to replace the current streamer technology where the signal is recorded using hydrophones only, by a vector sensing streamer where the measurement of the seismic signal is carried out using co-located hydrophone and particle motion sensors. This would enable a very powerful solutions to longstanding seismic problems such as multiple attenuation, imaging, some of the outstanding time-lapse issues, etc. Most of the applications based on the vector sensing streamer require the combination of hydrophone and particle motion data though some kind of filtering (wavenumber and/or frequency dependent) of one of the data types before summing it to the other data type. One of the main potential problems with a particle motion sensor is that it is expected to be substantially noisier compared to a hydrophone over a significant part of the frequency band of interest (e.g., the low frequencies).

The present invention is directed to resolving, or at least reducing, one or all of the problems mentioned above.

SUMMARY OF THE INVENTION

In its various aspects and embodiment, the present invention comprises a method and apparatus. In a first aspect, the invention comprises a method, comprising: recording a first set of data using a first type of sensor; recording a second set of data using a second type of sensor, the first and second sets of data being contemporaneously acquired by co-located sensors; and removing noise from the first data set using the second data set.

In another aspect, the invention comprises an apparatus comprising: a survey vessel; an array of streamers towed by the survey vessel; a plurality of paired, co-located sensors; and a computing apparatus. The sensors are distributed densely along each the streamers, a first one of each sensor pair being a first sensor of a first type and a second one of each sensor pair being a second sensor of a second type, each one of the paired sensors being co-located. The computing apparatus, programmed to: record a first set of data using a first type of sensor; record a second set of data using a second type of sensor, the first and second sets of data being contemporaneously acquired by co-located sensors; and remove noise from the first data set using the second data set.

In other aspects, the invention includes: a program storage medium encoded with instructions that, when executed by a computing apparatus, perform the method set forth above; and a computing apparatus programmed to perform the method.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
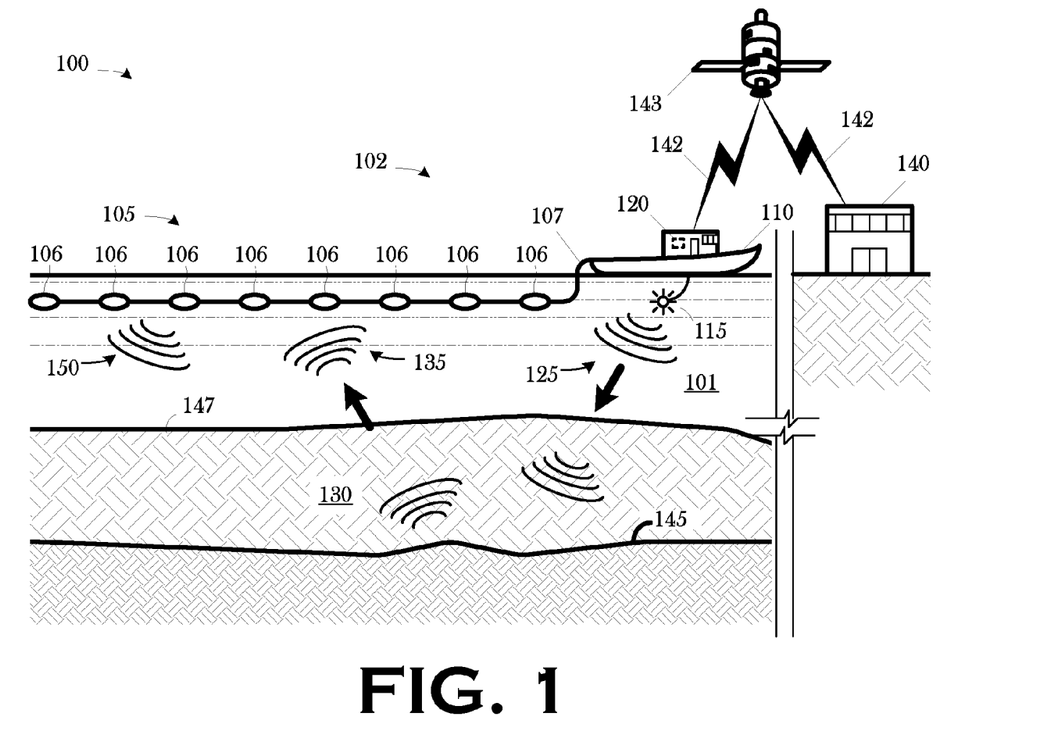
FIG. 1 depicts a marine seismic survey practiced in accordance with the present invention.

FIG. 1 illustrates an exemplary marine seismic survey 100 in profile. The marine seismic survey 100 may be conducted in virtually any body of water. Thus, in accordance with usage in the art, the term "marine" does not necessarily imply a saltwater acquisition environment. The water 101 may be saltwater, fresh water, or brackish water. The marine seismic survey 100 employs a seismic survey system 102 by which seismic data may be acquired for processing in accordance with the present invention. The seismic survey system 102 includes a seismic recording array 105 and may be constructed in accordance with conventional practice. The recording array 105 includes a plurality of instrument sondes 106 comprising a portion of at least one seismic streamer 107. As those in the art having the benefit of this disclosure will appreciate, most embodiments will typically employ multiple seismic streamers 107 arrayed behind the survey vessel 110. Furthermore, streamers typically include positioning devices (e.g., steerable floats or "birds") that are omitted for the sake of clarity and so as not to obscure the present invention.

Figure 2A:
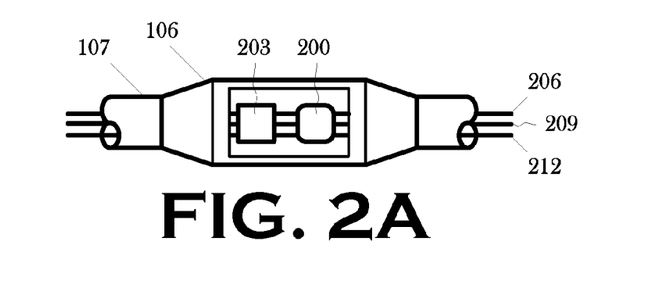
FIG. 2A, FIG. 2B depict two alternative sensor arrangements for the marine seismic survey of FIG. 1.

Turning now to FIG. 2A, the instrument sondes 106 house, in the illustrated embodiment, an acoustic sensor 200 (e.g., hydrophones) such as is known to the art, and a particle motion sensor 203. The particle motion sensors 203 measure not only the magnitude of passing wavefronts, but also their direction. Thus, it would be possible to distinguish data representing upward propagating wavefronts, such as the reflections 135, from the downward propagating wavefronts, such as the multiple reflection 150.

Figures 3, 4:
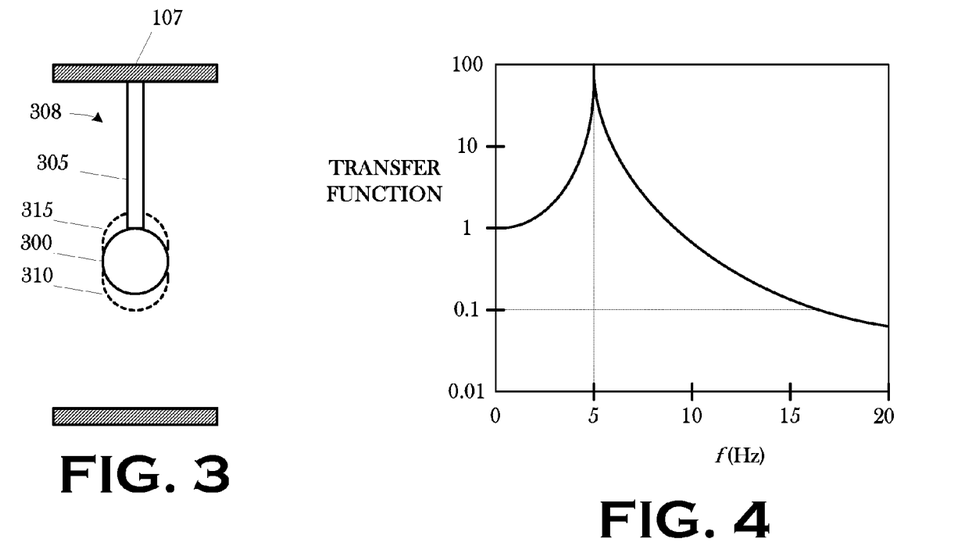
FIG. 3 generally and conceptually illustrates a particle motion sensor as may be employed in one aspect of the present invention.
FIG. 4 illustrates cable movement transfer to sensor movement as a function of frequency for a given sensor mass and spring stiffness.
Figure 5A:
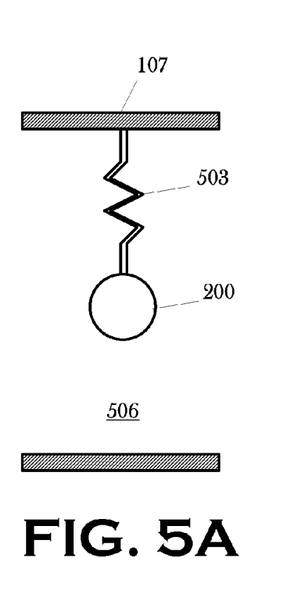
FIG. 5A-FIG. 5C depict alternative embodiments of the particle motion sensor of FIG. 3.
Figure 5B:
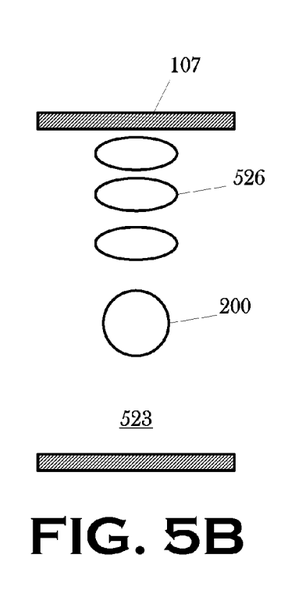
Figure 5C:
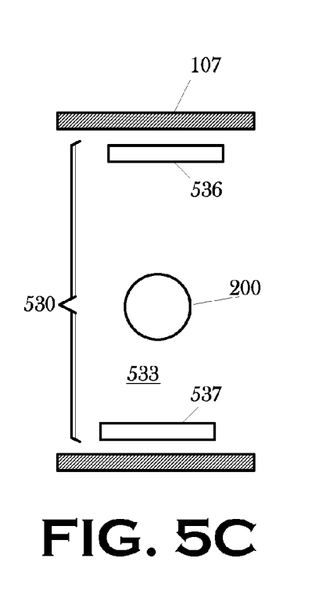

FIG. 3 generally and conceptually illustrates a particle motion sensor 203. A sensor element 300 is shown biased to a first position by a biasing means 305. The invention admits variation in the implementation of the sensor element 300 and the biasing means 305. For example, the sensor element 300 may be a velocity meter or an accelerometer. Various alternative embodiments for the biasing means 305 are described further below relative to FIG. 5A-FIG. 5C. FIG. 5A-FIG. 5C illustrate, by way of example and illustration, three different biasing means and, consequently, three different means for detecting the direction of travel for a passing wavefront. Other embodiments may employ alternative means. The particle motion sensor 203 is disposed within the streamer 106 to help isolate it from environmental conditions.

The sensor element 300 and biasing means 305 effectively define a spring-mass system. When there is structural vibration noise in the seismic cable 107, it will also move the sensor element 300 built into the streamer 106. The attachment of the biasing means 305 to the streamer 106 is designed to minimize the vibration transfer from the streamer 106 to the particle motion sensor 203 for the frequency band of interest. The frequency band of interest will be a function of the seismic source 115 for the survey 103. The nature of this function will be apparent to those skilled in the art having the benefit of this disclosure. For instance, impulse sources, such as airguns, generate signals of known frequencies. Similarly, a vibroseis source will be selected for the frequencies in its sweep.

For purposes of illustration, define the ratio of sensor movement versus cable vibration as Vibration Transfer Ratio. When this ratio is 1 the particle motion sensor 203 is following the seismic cable 107 fully and all vibrations are picked up by the particle motion sensor 203. If this ratio is 0, no vibration will be transferred to the particle motion sensor 203 and it will not give output. And if the ratio is high (>1), there will be an amplification of the vibration as resonance and the particle motion sensor 203 will pick up great signals.

The transfer of structural vibrations from the seismic cable 107 to the particle motion sensor 203 should be minimized. A low vibration transfer is therefore desirable. The natural frequency $f_n$ (Hz) of the spring-mass system in FIG. 3, is calculated as:

$$f_n = \frac{1}{2\pi}\sqrt{\frac{k}{m}} \quad (1)$$

where:
k = the spring stiffness of the biasing means 305, and
m = the mass of the sensor element 300, plus any added mass from the surrounding medium.

If we, for instance, are interested in the frequency band from the 10 Hz-300 Hz for a seismic signal, we will minimize the noise pick-up from cable vibrations in this band. The mass of the particle motion sensor 203 and suspension spring stiffness then needs to be combined to make a system with lower than 10 Hz natural frequency, as this will work as a high cut filter for frequencies above the natural frequency passing from the seismic cable 107 to the particle motion sensor 203.

FIG. 4 shows a principle of cable movement transferring to sensor movement as a function of frequencies for a sensor mass and spring stiffness. FIG. 4 shows that, if the system is designed so that the natural frequency $f_n$ is below the frequency band of interest for seismic signals, this will damp structural movements passing from the seismic cable 107 into the particle motion sensor 203. FIG. 4 assumes a natural frequency of 5 Hz, and shows a 10 times reduction in transfer function between cable and sensor at ~17 Hz.

The biasing means 305 should be designed for the desired stiffness only for small relative displacements. The stiffness of the biasing means 305 is chosen dependent of the mass of the particle motion sensor 203. To fit a particle motion sensor 203 inside a seismic cable 107, it will be in the range between 1 and 1,000 grams, and the spring stiffness should be designed accordingly within the range of 1.0 N/m and 1000 N/m if a desired resonance frequency is 5 Hz.

The biasing means 305 may be implemented as any one of a variety of elastic means that de-couple the sensor element 300 from the seismic cable 107. It may be fabricated from, for example, a metal, a synthetic polymer, an expanded polymer, or a rubber. If the material is electrically conductive, the biasing means 305 may also provide an electrical connection between the sensor element 300 and the electrical leads of the seismic cable 107. Some embodiments may even employ a magnetic field generated by passive or controlled magnets. FIG. 5A-FIG. 5C illustrate these alternative embodiments of the biasing means 305 and will be discussed more fully below.

Returning now to FIG. 3, as was noted above, the biasing means 305 biases the sensor element 300 to a first position shown. Traveling wavefronts will impart a slight force on the seismic cable 107. Thus, the position of the sensor element 300 will change. For instance, responsive to an upward traveling wavefront, the sensor element 300 will move to the second position 310, shown in ghosted lines. Responsive to a downward traveling wavefront, the sensor element 300 will move to the second position 315, also shown in ghosted lines. The motion sensor element 300 will detect this change in absolute position. More particularly, sensor element 300 will detect some vector quantity associated with the change in position. For instance, an accelerometer will measure the acceleration and a velocity meter will measure the velocity. Note that acceleration and velocity are both vector quantities defined not only by magnitude, by also by direction.

The sensor element 300 then transmits data representative of the detected quantity over the electrical leads (not shown) of the seismic cable 107. As noted above, if the biasing means 305 is electrically conductive, the sensor element 300 may do this over the biasing means 305. If the biasing means 305 is not adequately electrically conductive, a separate electrical lead (not shown) may be used. Typically, the data is transmitted over the same leads of the seismic cable 107 as is the seismic data collected by the acoustic receivers 106.

This is not necessary to the practice of the invention. However, size, weight and power constraints will typically make this desirable. The data generated by the sensor element 300 will therefore need to be interleaved with the seismic data. Techniques for interleaving information with this are known to the art. For instance, the two kinds of data may be multiplexed. Any suitable techniques for interleaving data known to the art may be employed.

The data generated by the sensor element 300 is transmitted over the seismic cable to the data collection unit 120. The data collection unit 120 receives the seismic data (hydrophone as well as particle motion sensor data), and records it. The particle motion sensor data is recorded in, for example, a data storage in any suitable data structure known to the art. The particle motion sensor data can then be processed along with the hydrophone data to for instance suppress unwanted multiples.

Turning now to FIG. 5A, one particular embodiment of the biasing means 205 is shown. The biasing means 503 comprises a spring by which the sensor element 200 is suspended. This spring 503 and sensor element 200 are disposed within a damping fluid 506. The spring 503 may be either a coil spring or a leaf spring and is selected using the criteria set forth above.

FIG. 5B depicts a second alternative embodiment of the biasing means 205. The biasing means 220 comprises a body of foam 523 defining a plurality of voids 226 (only one indicated). The voids 526 may be empty, or may be filled with a fluid of some kind (not shown). The voids 526 are oblate spheroids in shape, but other geometries may be used. In general, the number and shape of the voids will be selected in conjunction with the selection of the foam 523 to achieve the desired "spring stiffness" of the biasing means 220.

FIG. 5C illustrates yet a third embodiment of the biasing means 205. The biasing means 530 comprises a damping medium 533 in which the sensor element 200 is suspended and a pair of magnets 536, 537. The magnets 536, 537 may be passive or active. When powered, they may be powered on an electrical lead (not shown) tapping a power signal (also not shown) in the seismic cable 107. The strength of the magnetic field generated by the magnets 536, 537 will be a function of not only the mass of the sensor element 200, but also the characteristics of the damping medium 533. The characteristics of the damping medium 533 in conjunction with the strength of the magnetic field will determine the "spring stiffness" of the biasing means 530.

Suitable particle motion sensors are known to the art and may be used to implement the particle motion sensors 203. For example, suitable particle motion sensors are disclosed in:

U.S. application Ser. No. 10/792,511, entitled "Particle Motion Sensor for Marine Seismic Sensor Streamers," filed Mar. 3, 2004, in the name of the inventors Stig Rune Lennart Tenghamn and Andre Stenzel (published Sep. 8, 2005, as Publication No. 2005/0194201);

U.S. application Ser. No. 10/233,266, entitled "Apparatus and Methods for Multicomponent Marine Geophysical Data Gathering," filed Aug. 30, 2002, in the name of the inventors Stig Rune Lennart Tenghamn et al. (published Mar. 4, 2004, as Publication No. 2004/0042341); and U.S. Pat. No. 3,283,293, entitled "Particle Velocity Detector and Means for Canceling the Effects of Motional Disturbances Applied Thereto," naming G. M. Pavey, Jr. et al. as inventors, and issued Nov. 1, 1966.

Any suitable particle motion sensor known to the art may be used to implement the particle motion sensor 203.

Figure 2B:
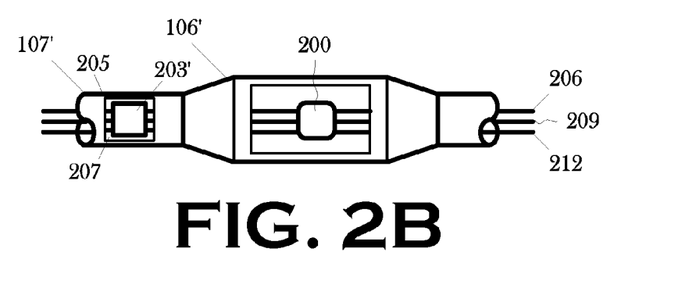

Returning to FIG. 2A, the acoustic sensor 200 and the particle motion sensor 203 are "co-located" in that they are both housed in the sensor sonde 106. Co-location is desirable, inasmuch as it is desirable for the noise measurements to taken as close to the point the seismic data is acquired as is reasonably possible. More distance between the noise data acquisition and the seismic data acquisition will mean less accuracy in the measurement of noise at the point of seismic data acquisition. However, it is not necessary that the particle motion sensor be positioned within the sensor sonde 106. For example, as is shown in FIG. 2B, the particle motion sensor 203' may be positioned in a fluid-filled pocket 205 in the seismic cable 107. The particle motion sensor 203 is "co-located" with the acoustic sensor 200 in that it is sufficiently proximate that the noise data it acquires reasonably represents the noise component of the acquired seismic data.

The particle motion sensor 203' in FIG. 2B may be, for example, an accelerometer immersed in a fluid 207, such as kerosene. If the major concern is noise levels on the acoustic sensors 200, one can use accelerometer data to correct the hydrophone data as is discussed more fully below. This should be particularly applicable to kerosene pockets in a solid cable. The pressure distribution within the fluid-filled pocket 205 is related to the vibration of the pocket 205. With a good estimate of the noise part (vibration) of the in-line acceleration, one can use this information to correct the pressure measurement. The noise part of the inline acceleration can be isolated using mechanical filtering effects, predicted through experiments, analytical analysis, numerical simulations or from a combination of these. The relation between in-line vibration and the pressure distribution inside a pocket can be found using experiments, analytical analysis, numerical simulations or from a combination of these.

Referring to both FIG. 2A and FIG. 2B, the seismic cable 107 is shown including a power lead 206, a command and control line 209, and a data line 212. As those in the art will appreciate, a variety of signals are transmitted up and down the seismic cable 107 during the seismic survey. For instance, power is transmitted to the electronic components (e.g., the acoustic sensor 200 and particle motion sensor 203), control signals are sent to positioning elements (not shown), and data is transmitted back to the vessel 110. To this end, the seismic cable 107 provides a number of lines over which these signals may be transmitted. Those in the art will further appreciate that there are a number of techniques that may be employed that may vary the number of lines used for this purpose. The illustrated embodiment employs three leads dedicated to the three functions for simplicity of illustration and so as not to obscure the present invention. Furthermore, the seismic cable 107 will also typically include other structures, such as strengthening members (not shown), that are omitted for the sake of clarity.

Returning now to FIG. 1, the survey system 100 also includes a seismic source 115 and a data collection unit 120. The seismic source 115 may be a vibroseis source or an impulse source, such as explosives or an air gun, as are known in the art. Note that embodiments may employ multiple sources 115 in arrays using techniques known to the art. Those skilled in the art will realize that the embodiments illustrated herein can be extrapolated to apply the present invention to embodiments employing multiple seismic sources 115. The data collection unit 120 is centrally located on the survey vessel 110. However, as will be appreciated by those skilled in the art, various portions of the data collection unit 120 may be distributed in whole or in part, e.g., across the seismic recording array 105, in alternative embodiments.

The geological formation 130 presents a seismic reflector 145. As those in the art having the benefit of this disclosure will appreciate, geological formations under survey can be much more complex. For instance, multiple reflectors presenting multiple dipping events may be present. FIG. 1 omits these additional layers of complexity for the sake of clarity and so as not to obscure the present invention.

Still referring to FIG. 1, the seismic source 115 generates a plurality of seismic survey signals 125 in accordance with conventional practice as the survey vessel 110 tows the streamers 107 across the area to be surveyed in a predetermined pattern. The seismic survey signals 125 propagate and are reflected by the subterranean geological formation 130. The acoustic sensors 200 and particle motion sensors 203 detect the reflected signals 135 from the geological formation 130. The acoustic sensors 200 and particle motion sensors 203 then generate data representative of the reflections 135. The acoustic sensors 200 generate seismic data comprising the amplitudes of the reflections 135 as a function of time. The particle motion sensors 203 generate vector data indicating the direction of the passing wavefront, i.e., the reflections 135. The seismic data and the vector data are, at this point, embodied in electrical or optical signals.

Figure 6:
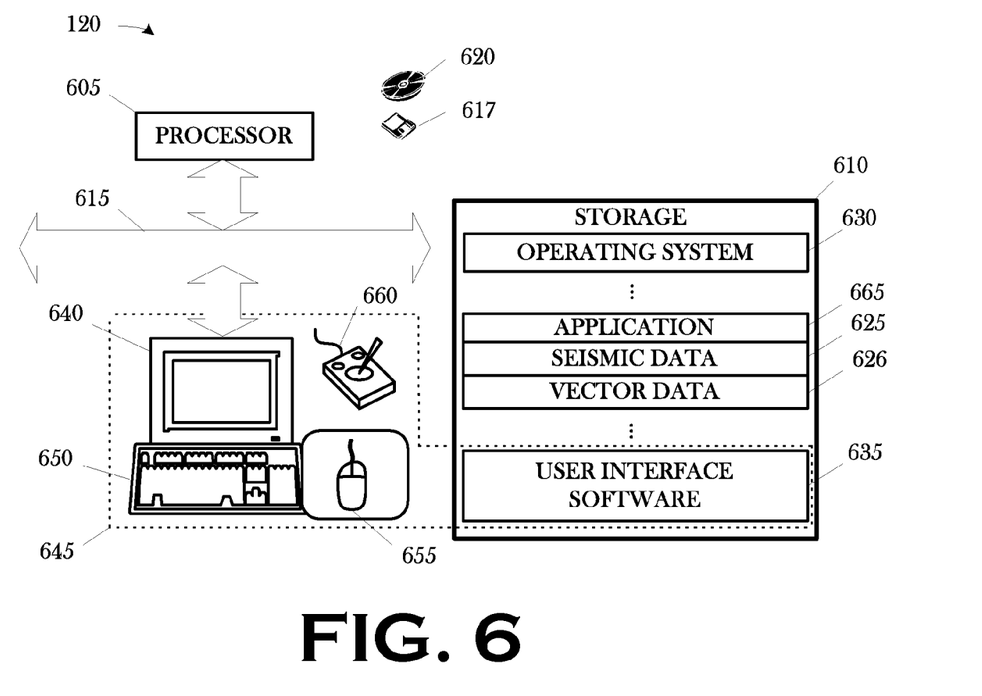
FIG. 6 shows selected portions of the hardware and software architecture of a computing apparatus such as may be employed to implement the data collection unit of the survey in FIG. 1.

The signals generated by the acoustic sensors 200 and particle motion sensors 203 are communicated to the data collection unit 120 over the data line 212, shown in FIG. 2A, of the seismic cable 107. FIG. 6 shows selected portions of the hardware and software architecture of the data collection unit 120. The data collection unit 120 includes a processor 605 communicating with storage 610 over a bus system 615. The storage 610 may include a hard disk and/or random access memory ("RAM") and/or removable storage such as a floppy magnetic disk 617 and an optical disk 620.

The storage 610 is encoded with an operating system 630, user interface software 635, and an application 665. The user interface software 635, in conjunction with a display 640, implements a user interface 645. The user interface 645 may include peripheral I/O devices such as a keypad or keyboard 650, a mouse 655, or a joystick 660. The processor 605 runs under the control of the operating system 630, which may be practically any operating system known to the art. The application 665 is invoked by the operating system 630 upon power up, reset, or both, depending on the implementation of the operating system 630. The application 665, when invoked, performs the software implemented tasks associated with the collection and processing of data generated during the seismic survey. The user may invoke the application in conventional fashion through the user interface 645.

The storage 610 is also encoded with the seismic data 625 generated by the acoustic sensors 200 and the vector data 626 generated by the particle motion sensor 203. The seismic data 625 is representative not only of the reflections 135, but also noise occurring during the acquisition. That is, the seismic data set is "contaminated" with noise. The seismic data 625 and vector data 626 may be stored in any suitable data structure known to the art.

Thus, returning to FIG. 1, the data collection unit 120 collects the seismic data and vector data for processing. The data collection unit 120 may process the seismic data 625 and vector data 626 itself, store the data for processing at a later time, transmit the data to a remote location for processing, or some combination of these things. Typically, processing occurs at some later time after acquisition because of a desire to maintain production. The data may therefore be stored on a portable magnetic storage medium (e.g., the magnetic disk 617 or the optical disk 620, shown in FIG. 6) or wirelessly transmitted from the survey vessel 110 to a processing center 140 for processing in accordance with the present invention. Typically, in a marine survey, this will be over satellite links 142 and a satellite 143. Note that some alternative embodiments may employ multiple data collection systems 120.

In the illustrated embodiment, the seismic data 625 and the vector data 626 are processed in accordance with the present invention at the processing center 140. Note that there is no need for the seismic data 625 to reside on the same computing apparatus as the application by which it is processed. Some embodiments of the present invention may therefore be implemented on a computing system, e.g., the computing system 700 in FIG. 7, comprising more than one computing apparatus. For example, the seismic data 625 may reside on a server 703 and the application 665' by which it is processed on a workstation 706 where the computing system 700 employs a networked client/server architecture. Furthermore, although the vector data 626 is shown residing on the server 703, there is no requirement that the seismic data 625 and the vector data 626 reside together.

Figure 7:
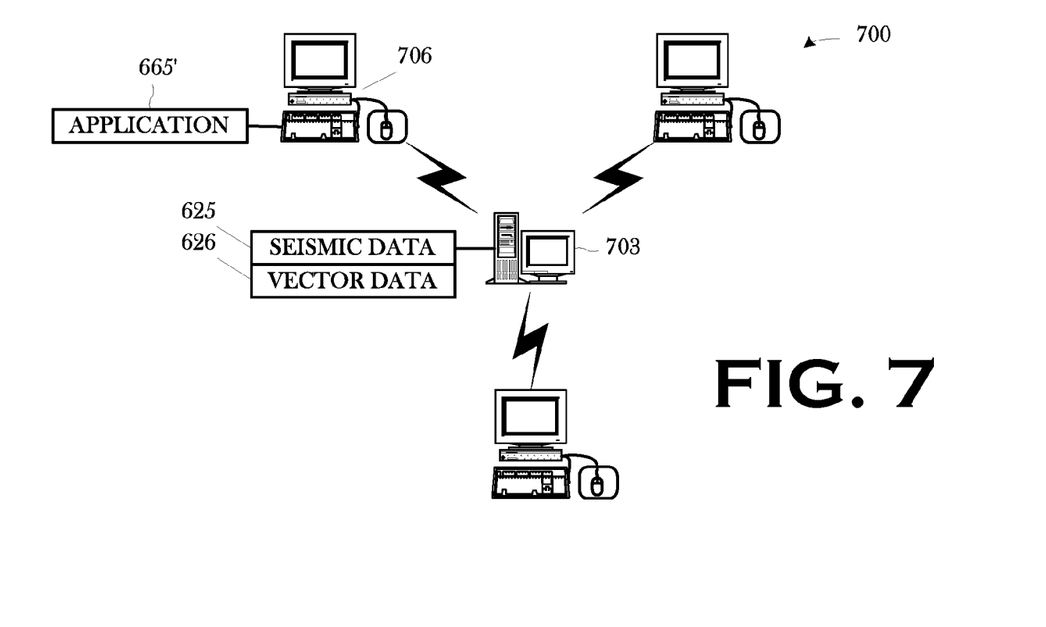
FIG. 7 depicts a computing system on which some aspects of the present invention may be practiced in some embodiments.

There also is no requirement that the computing system 700 be networked. Alternative embodiments may employ, for instance, a peer-to-peer architecture or some hybrid of a peer-to-peer and client/server architecture. The size and geographic scope of the computing system 700 is not material to the practice of the invention. The size and scope may range anywhere from just a few machines of a Local Area Network ("LAN") located in the same room to many hundreds or thousands of machines globally distributed in an enterprise computing system.

The workstation 706 includes a software and hardware architecture comprising a user interface and storage such as the user interface 645 and the storage 610, shown in FIG. 6, of the data collection unit 120. The workstation 706 includes an application 665' residing on its storage 610 that, when invoked, performs a method for processing the seismic data 625 in accordance with one aspect of the present invention.

Figure 8:
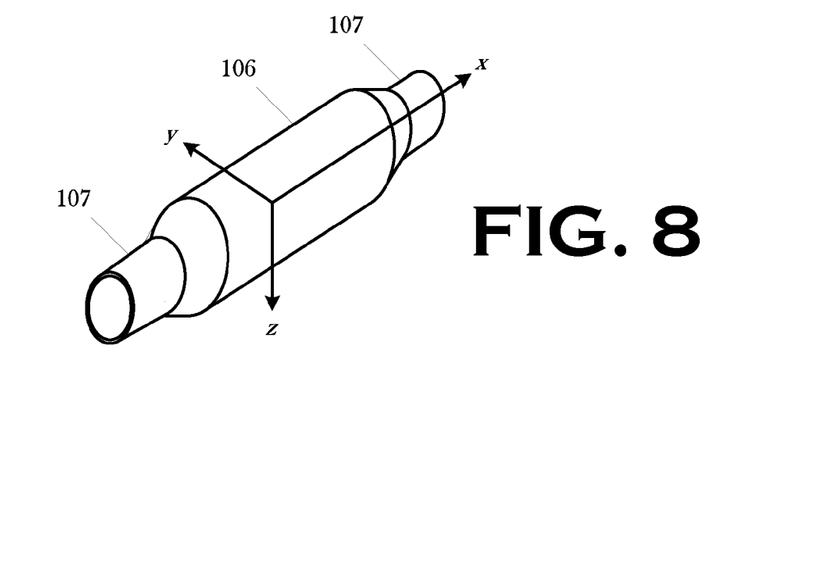
FIG. 8 illustrates the Cartesian coordinate system employed in the description of the illustrated embodiment.

Thus, returning to FIG. 6, the application 665 can then use the vector data 626 to remove or suppress the inline component of the noise in the recorded seismic data 625 in accordance with one aspect of the present invention. The following discussion will employ a Cartesian (or x-y-z) coordinate system illustrated in FIG. 8, wherein the x-axis is inline, the y-axis is crossline, and the z-axis is depth. Now, employing this coordinate system, the particle motion sensor at recording location $x_r$ records a signal corresponding to the particle acceleration that may be described as:

$$\bar{a}(t,x_r) = (a_x(t,x_r), a_y(t,x_r), a_z(t,x_r)) \quad (2)$$

Note that the raw data may be proportional to particle velocity or particle displacement, or may have some other frequency-dependent characteristics that can simply be compensated for through a predictable frequency-dependent filter to yield acceleration. Also, the particle motion data may need to be rotated to correspond to the Cartesian coordinate system where x denotes the in-line direction, z the vertical direction and y the cross-line direction.

The acoustic sensors 200 are spaced regularly and densely along the seismic streamer 107. The equation of motion tells us how to relate the in-line gradient of the acoustic sensor recordings $P(t,x_r)$ to the in-line component of particle acceleration $a_x(t,x_r)$:

$$a_x(t, x_r) = \frac{1}{\rho} \partial_x P(t, x_r), \quad (3)$$

where ρ is the density of the medium in which the particle motion sensor is located (e.g., kerosene in a fluid-filled streamer).

However, the particle motion sensors record noise $\bar{n}(t,x_r)$ in addition to the signal such that the total recording of the particle sensor described by Eq. (4):

$$\bar{d}(t,x_r) = (d_x(t,x_r), d_y(t,x_r), d_z(t,x_r)) \quad (4)$$

is $$\bar{d}(t,x_r) = \bar{a}(t,x_r) + \bar{n}(t,x_r) \quad (5)$$

Note that by noise we consider any non-acoustic energy propagating in the water (which is considered as signal in this invention). The noise can originate from vibrations in the streamer induced by for instance tugging or steering, or can have the origin in the flow around the streamer skin as the streamer is towed through the water.

From Eq. (3) and Eq. (5), the inline noise component $n_x(t,x_r)$ can be estimated—provided that the acoustic sensor recordings can be regarded as noise free—as:

$$n_x(t, x_r) = d_x(t, x_r) - \frac{1}{\rho} \partial_x P(t, x_r) \quad (6)$$

If the major concern is noise levels on acoustic sensors, one can therefore use accelerometer data to correct the hydrophone data. This should be particularly applicable to hydrophones in a solid/semi-solid cable.

More particularly, the pressure distribution within a fluid-filled pocket is related to the vibration of the pocket. A hydrophone is usually thought of as being insensitive to vibration, but this is only partially true. The hydrophone recordings contain both signal and vibration caused noise according to Eq. (7).

$$P(t,x_r) = P_S(t,x_r) + P_N(t,x_r) \quad (7)$$

Provided that the accelerometers are densely spaced, the vibration can be isolated from the signal on accelerometers through frequency wavenumber (also known as "FK") filtering to yield a good estimate of $\bar{n}(t,x_r)$ from Eq. (5).

The hydrophone sensitivity to vibration can be thought of as a calibration value, i.e.:

$$\bar{S}(\omega) = (S_x(\omega), S_y(\omega), S_z(\omega)) \quad (8)$$

specific to each hydrophone mounting. The noise portion of the hydrophone readings can be estimated according to Eq. (9) and hence be removed.

$$P_N(t,x_r) = S_x(\omega)n_x(t,x_r) + S_y(\omega)n_y(t,x_r) + S_z(\omega)n_z(t,x_r) \quad (9)$$

Thus, this vibration caused noise, $P_N(t,x_r)$, can be determined and removed from the acoustic sensor data. The calibration values can be tested for and set during manufacturing or the system can allow these values to be set during operation or the system can be made self adoptable to calibrate itself in-sea.

Figure 9:
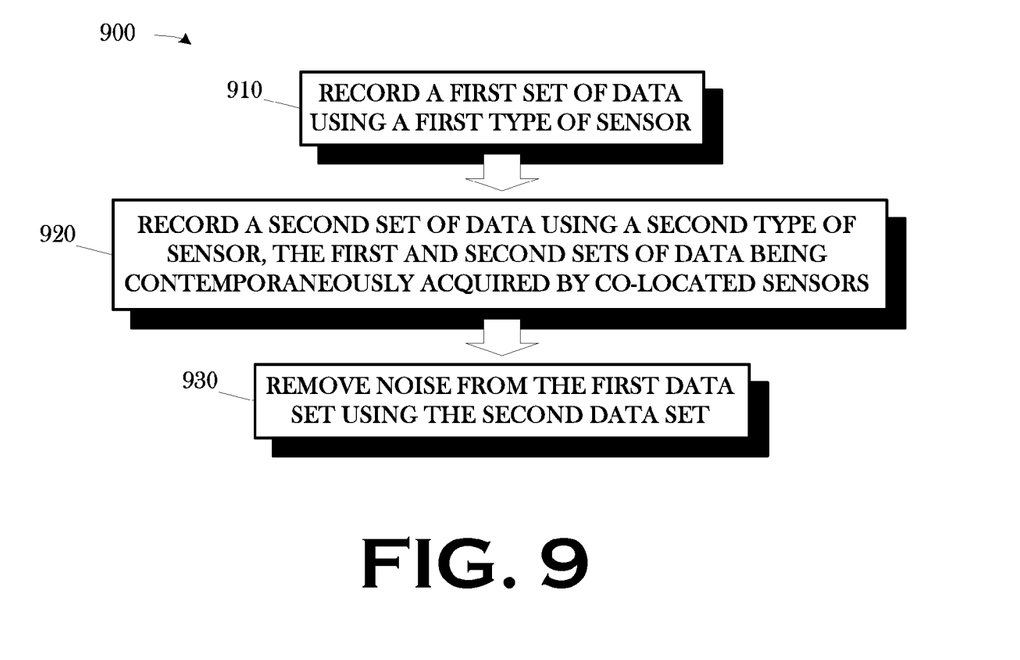
FIG. 9 illustrates a method practiced in accordance with one aspect of the present invention.
Figure 10A:
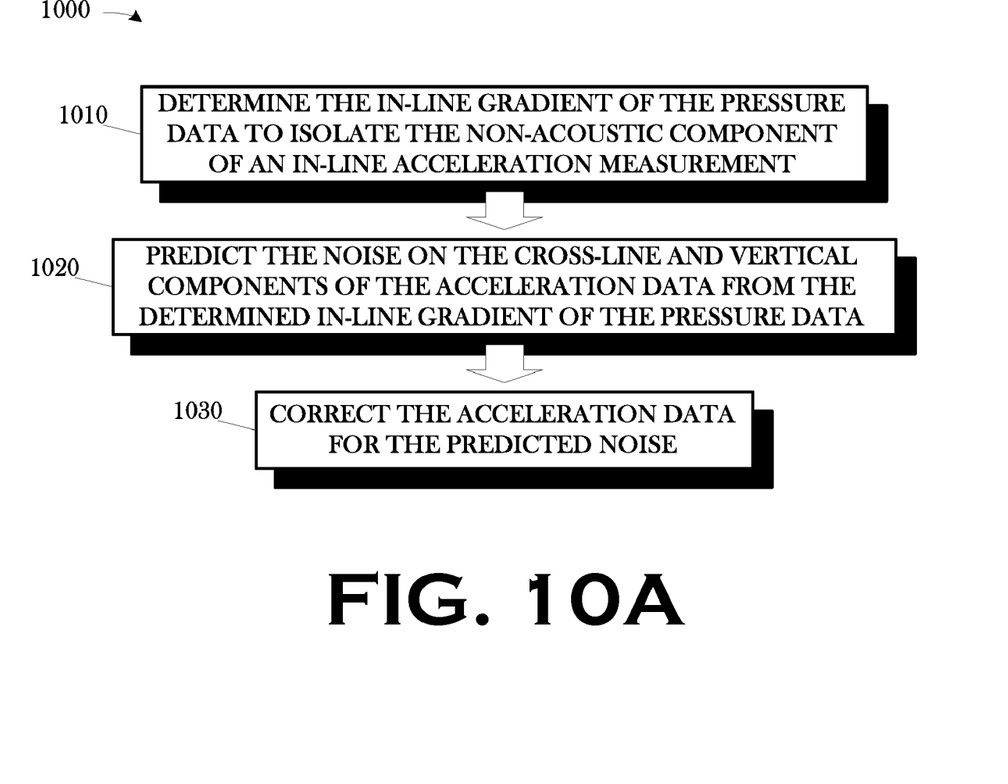
FIG. 10A-FIG. 10B illustrate two embodiments of the method illustrated in FIG. 9.

Turning now to FIG. 9, in one aspect, the present invention includes a method 900. The method 900 comprises records (at 910) a first set of data using a first type of sensor. The method 900 then records (at 920) a second set of data using a second type of sensor, the first and second sets of data being contemporaneously acquired by co-located sensors The method 900 then removes (at 930) noise from the first data set using the second data set In the first embodiment disclosed above, shown in FIG. 10A as the method 1000, the act of noise removal (at 930, FIG. 9) includes determining (at 1010) the in-line gradient of the pressure data to isolate the non-acoustic component of an in-line acceleration measurement; predicting (at 1020) the noise on the cross-line and vertical components of the acceleration data from the determined in-line gradient of the pressure data; and correcting (at 1030) the acceleration data for the predicted noise. That is, this particular embodiment uses the in-line gradient of hydrophone data to isolate the non-acoustic component of an in-line acceleration measurement (i.e., the resulting signal correspond to vibrational noise). Subsequently, this knowledge of the in-line component of the noise may be used to predict the noise on the cross-line and vertical components of acceleration. In the particular embodiment illustrated, this is performed using the transfer functions.

Figure 10B:
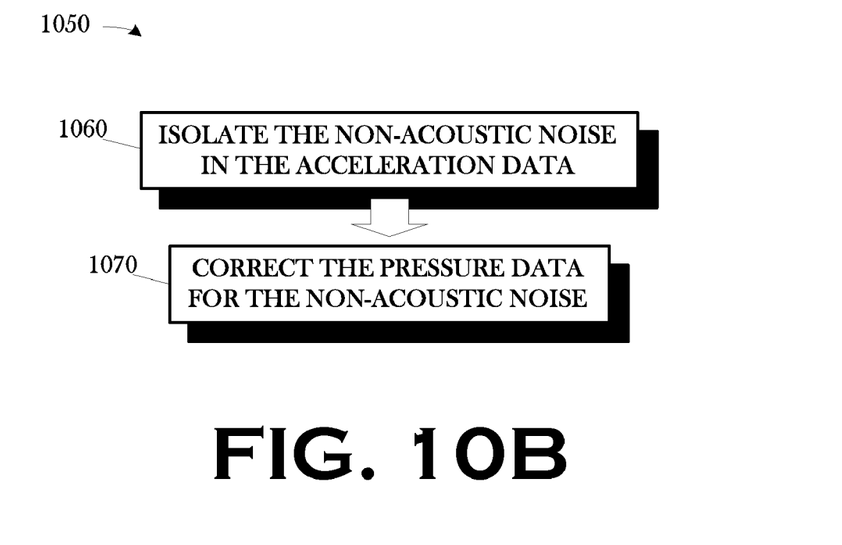

In the second embodiment disclosed above, shown in FIG. 10B as the method 1050, the act of noise removal (at 930, FIG. 9), includes isolating (at 1060) the non-acoustic noise in the acceleration data; and correcting (at 1070) the pressure data for the non-acoustic noise. That is, pre-process 3C acceleration data is pre-processed to isolate the non-acoustic noise (i.e., vibrational noise). These vibrations cause noise on hydrophones, especially when these are mounted inside fluid-filled voids. This information is then used to correct the pressure measurement. The noise part of the inline acceleration can be isolated using mechanical filtering effects, predicted through experiments, analytical analysis, numerical simulations or from a combination of these The present invention therefore estimates the noise on the particle motion sensors so that it can be subtracted from the particle motion recordings leaving the signal largely untouched. Thus, by measuring both the in-line component of particle motion as well as the hydrophone recordings along a streamer we show how the non-acoustic noise can be estimated. This can in turn be used to predict the noise on the cross-line and vertical components of particle motion if transfer functions of noise between the different components are known. A prediction of the non-acoustic noise can be used for noise cancellation on the hydrophone recordings.

As is apparent from the description above, some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   recording a first set of data using a first type of sensor;
   recording a second set of data using a second type of sensor, the first and second sets of data being contemporaneously acquired by co-located sensors;
   estimating an inline noise component in the first set of data from the second set of data using $n_x(t,x_r)=d_x(t,x_r)-1/\rho\partial_x P(t,x_r)$, where $d_x(t,x_r)$ represents recording of a particle sensor in the inline direction, $a_x(t,x_r)=1/\rho\partial_x P(t,x_r)$, $P(t,x_r)$ represents the inline gradient of acoustic sensor recordings and $a_x(t,x_r)$ represents the inline component of particle acceleration and $\rho$ represents the density of the medium in which the particle sensor is located; and
   correcting the first set of data using the estimated inline noise component.

2. The method of claim 1, wherein recording the first data set using a first type of sensor includes recording a set of pressure data using a hydrophone.

3. The method of claim 1, wherein the second set of data comprises vector data.

4. The method of claim 1, wherein the vector data is recorded using an accelerometer.

5. The method of claim 1, wherein the first set of data comprises vector data.

6. The method of claim 5, wherein the vector data is recorded using an accelerometer.

7. The method of claim 1, wherein recording the second data set using a second type of sensor includes recording a set of pressure data using a hydrophone.

8. The method of claim 1, wherein the first data set is pressure data and the second data set is acceleration data, and further comprising:
   determining the in-line gradient of the pressure data to isolate the non-acoustic component of an in-line acceleration measurement;
   predicting the noise on the cross-line and vertical components of the acceleration data from the determined in-line gradient of the pressure data; and
   correcting the acceleration data for the predicted noise.

9. The method of claim 8, wherein correcting the acceleration data includes subtracting the predicted noise component from the acceleration data.

10. The method of claim 8, wherein the first data set is pressure data and the second data set is acceleration data, and further comprising:
    isolating the non-acoustic noise in the acceleration data; and
    correcting the pressure data for the non-acoustic noise.

11. The method of claim 10, wherein correcting the pressure data includes subtracting the isolated non-acoustic noise from the pressure data.

12. The method of claim 1, further comprising acquiring the first set of data and the second set of data.

13. The method of claim 12, further comprising transmitting or transporting the acquired data to a remote location for the estimation and correction.

14. The method of claim 1, further comprising transmitting or transporting the first and second data sets to a remote location for the estimation and correction.

15. A program storage medium encoded with instructions that, when executed by a computing apparatus, perform a method comprising:
- recording a first set of data using a first type of sensor;
- recording a second set of data using a second type of sensor, the first and second sets of data being contemporaneously acquired by co-located sensors;
- estimating an inline noise component in the first set of data from the second set of data using $n_x(t,x_r)=d_x(t,x_r)-1/\rho\partial_x P(t,x_r)$, where $d_x(t,x_r)$ represents recording of a particle sensor in the inline direction, $a_x(t,x_r)=1/\rho\partial_x P(t,x_r)$, $P(t,x_r)$ represents the inline gradient of acoustic sensor recordings and $a_x(t,x_r)$ represents the inline component of particle acceleration and $\rho$ represents the density of the medium in which the particle sensor is located; and
- correcting the first set of data using the estimated inline noise component.

16. A computing apparatus, comprising:
- a processor;
- a bus system;
- a storage communicating with the processor over the bus system; and
- a software application residing on the storage that, when invoked by the processor, performs a method including:
  - recording a first set of data using a first type of sensor;
  - recording a second set of data using a second type of sensor, the first and second sets of data being contemporaneously acquired by co-located sensors;
  - estimating an inline noise component in the first set of data from the second set of data using $n_x(t,x_r)=d_x(t,x_r)-1/\rho\partial_x P(t,x_r)$, where $d_x(t,x_r)$ represents recording of a particle sensor in the inline direction, $a_x(t,x_r)=1/\rho\partial_x P(t,x_r)$, $P(t,x_r)$ represents the inline gradient of acoustic senor recordings and $a_x(t,x_r)$ represents the inline component of particle acceleration and $\rho$ represents the density of the medium in which the particle sensor is located; and
  - correcting the first set of data using the estimated inline noise component.

17. An acquisition system, comprising:
- a survey vessel;
- an array of streamers towed by the survey vessel;
- a plurality of paired, co-located sensors distributed densely along each the streamers, a first one of each sensor pair being a first sensor of a first type and a second one of each sensor pair being a second sensor of a second type, each one of the paired sensors being co-located; and
- a computing apparatus, programmed to:
  - recording a first set of data using the first type of sensor;
  - recording a second set of data using the second type of sensor;
  - estimating an inline noise component in the first set of data from the second set of data using $n_x(t,x_r)=d_x(t,x_r)-1/\rho\partial_x P(t,x_r)$, where $d_x(t,x_r)$ represents recording of a particle sensor in the inline direction, $a_x(t,x_r)=1/\rho\partial_x P(t,x_r)$ $P(t,x_r)$ represents the inline gradient of acoustic senor recordings and $a_x(t,x_r)$ represents the inline component of particle acceleration and $\rho$ represents the density of the medium in which the particle sensor is located; and
  - correcting the first set of data using the estimated inline noise component.

18. The apparatus of claim 17, wherein the first type of sensor is a seismic sensor.

19. The apparatus of claim 18, wherein the second type of sensor is a vector sensor.

20. The apparatus of claim 17, wherein the first type of sensor is a vector sensor.

21. The apparatus of claim 20, wherein the second type of sensor is a seismic sensor.

22. The apparatus of claim 17, wherein the computing apparatus is aboard the survey vessel.

23. The apparatus of claim 22, wherein the computing apparatus collects the first and second sets of data from the sensors as they are acquired.

* * * * *